United States Patent [19]
Okuyama

[11] Patent Number: 6,163,428
[45] Date of Patent: Dec. 19, 2000

[54] INFORMATION-SIGNAL MULTIPLEXING TRANSMISSION APPARATUS USING A CASSETTE HAVING A RECORDING MEDIUM HOUSED THEREIN

[75] Inventor: Takehiko Okuyama, Kanagawa-ken, Japan

[73] Assignee: Kabushiki Kaisha Toshiba, Kawasaki, Japan

[21] Appl. No.: 09/276,500

[22] Filed: Mar. 25, 1999

Related U.S. Application Data

[62] Division of application No. 08/901,327, Jul. 28, 1997, Pat. No. 5,940,232, which is a continuation of application No. 08/312,191, Sep. 26, 1994, abandoned.

[30] Foreign Application Priority Data

Sep. 29, 1993 [JP] Japan .................................. 5-242690

[51] Int. Cl.⁷ .................................................. G11B 15/18
[52] U.S. Cl. .............................................. 360/69; 360/15
[58] Field of Search .............................. 360/69, 15, 96.5, 360/27

[56] References Cited

U.S. PATENT DOCUMENTS

| | | | |
|---|---|---|---|
| 4,338,644 | 7/1982 | Staar | 360/69 |
| 4,339,776 | 7/1982 | Langer et al. | 360/69 |
| 4,597,058 | 6/1986 | Izumi et al. | 364/900 |
| 4,672,554 | 6/1987 | Ogaki | 364/479 |
| 4,794,467 | 12/1988 | Okuyama | 360/15 |
| 5,636,078 | 6/1997 | Tsai | 360/72.1 |
| 5,847,898 | 12/1998 | Suzuki et al. | 360/69 X |
| 5,901,007 | 5/1999 | Oguro et al. | 360/69 |
| 5,907,444 | 5/1999 | Oguro | 360/69 |
| 5,923,486 | 7/1999 | Sugiyama et al. | 360/69 X |

FOREIGN PATENT DOCUMENTS

| | | |
|---|---|---|
| 246661 | 11/1987 | European Pat. Off. . |
| 424653 | 9/1990 | European Pat. Off. . |
| 449607 | 10/1991 | European Pat. Off. . |
| 2091515 | 7/1982 | United Kingdom . |
| WO92/22983 | 12/1992 | WIPO . |

OTHER PUBLICATIONS

Belgium Patent Abstract No. BE879620, STARR, Oct. 25, 1979.

Ide et al: "Data Compression and Digital Modulation" Nikkei Electronics Books, Cap. 1, p. 137–150 (1993).

*Primary Examiner*—Andrew L. Sniezek
*Attorney, Agent, or Firm*—Pillsbury Madison & Sutro LLP

[57] ABSTRACT

A microcomputer reads out cassette management information from an integrated-circuit memory on a cassette to give the same to a digital interface formatter. The digital interface formatter outputs the cassette management information by a digital interface format which packages reproduced digital image and audio signals from an error correction circuit and a sub-code and the cassette management information. Upon dubbing recording, a separation circuit extracts the cassette management information from a dubbing input to give the same to the microcomputer. On the basis of the inputted cassette management information, the microcomputer creates cassette management information corresponding to a program to be dubbed to store the same into the integrated-circuit memory. In this manner, upon dubbing, the image and audio information is recorded onto a tape and the cassette management information is automatically recorded onto the integrated-circuit memory. Thus, the user may avoid a complicated information input task.

20 Claims, 12 Drawing Sheets

FIG.3

| CASSETTE NUMBER | 3 |
|---|---|
| TAPE LENGTH | 4H |
| TAPE TYPE | . . . . |

| TITLE | GENRE | TV CHANNEL | RECORDED DATE | RECORDING START TIME CODE | . . . |
|---|---|---|---|---|---|
| TITLE 1 | 0 | 6 | 930614 | 0 : 00 : 05 | • |
| TITLE 2 | 3 | 10 | 930614 | 0 : 50 : 30 | • |
| TITLE 3 | 1 | 8 | 930617 | 2 : 00 : 05 | • |
| TITLE 4 | 5 | 1 | 930619 | 2 : 34 : 13 | • |
| ⋮ | ⋮ | ⋮ | ⋮ | ⋮ | ⋮ |

0 : NEWS
1 : SPORTS
2 : DRAMA
3 : PICTURE
•
•
•

FIG.7

| CASSETTE NUMBER | 5 | | | | |
|---|---|---|---|---|---|
| TAPE LENGTH | 2H | | | | |
| TAPE TYPE | . . . . | | | | |
| TITLE | GENRE | TV CHANNEL | RECORDED DATE | RECORDING START TIME CODE | . . . |
| TITLE 2 | 3 | 10 | 930614 | 0 : 00 : 00 | . |
| TITLE 3 | 1 | 8 | 930617 | 1 : 09 : 35 | . |
| TITLE 6 | 3 | 4 | 930530 | 1 : 43 : 43 | . |
| ⋮ | ⋮ | ⋮ | ⋮ | ⋮ | ⋮ |

FIG.13
(RELATED ART)

| CASSETTE NUMBER | 3 |
|---|---|
| TAPE LENGTH | 4H |
| TAPE TYPE | . . . . |

| TITLE | GENRE | TV CHANNEL | RECORDED DATE | RECORDING START TIME CODE | . . . |
|---|---|---|---|---|---|
| TITLE 1 | 0 | 6 | 930614 | 0 : 00 : 05 | • |
| TITLE 2 | 3 | 10 | 930614 | 0 : 50 : 30 | • |
| TITLE 3 | 1 | 8 | 930617 | 2 : 00 : 05 | • |
| TITLE 4 | 5 | 1 | 930619 | 2 : 34 : 13 | • |
| ⋮ | ⋮ | ⋮ | ⋮ | ⋮ | ⋮ |

INFORMATION-SIGNAL MULTIPLEXING TRANSMISSION APPARATUS USING A CASSETTE HAVING A RECORDING MEDIUM HOUSED THEREIN

This is a division of application Ser. No. 08/901,327, filed Jul. 28, 1997, now U.S. Pat. No. 5,940,232, which in turn is a continuation of application Ser. No. 08/312,191, filed on Sep. 26, 1994, now abandoned.

BACKGROUND OF THE INVENTION

1. Field of the Invention

The present invention relates to an information-signal recording apparatus, an information-signal reproducing apparatus and an information-signal recording and reproducing apparatus, which are capable of performing dubbing.

2. Related Art And Prior Art Statement

In recent years, a cassette management system has been developed in which the contents of a plurality of programs which are recorded in a cassette video tape are automatically displayed on a television image plane or a cassette body. A VTR (video tape recorder) which loads this system has also been merchandised. When a library of the cassette video tapes increases, it becomes difficult to grasp in how cassette tapes a desired program is stored, and the recorded position. The cassette management system displays management information every recording, to thereby facilitate retrieval operation of a user.

Various methods have been considered as the cassette management system. For example, there is a method in which a non-volatile memory is provided in a VTR body, and the contents thereof are stored correspondingly to numbers of all the cassettes. However, in case where there are many in number the cassettes to be managed, the memory capacity required increases. Accordingly, a method which has a recording medium on the side of the cassette is normally adopted as one for public welfare. For example, there are a method in which exclusive or dedicated bar code labels are stuck to the cassettes, a method in which the IC memory is attached to the cassettes, and the like.

FIG. 11 is an explanatory view showing an example of the former.

As shown in FIG. 11, a cassette deck body 1 is provided with a bar code reading writing section 2. When the cassette tape is loaded, a label 5 which is stuck onto a cassette 3 is opposed against the bar code reading writing section 2, and a bar code 4 on the label 5 is read by the bar code reading writing section 2. Cassette management information is recorded by the bar code 4. The cassette management information is displayed on, for example, an image plane on the basis of a signal from the bar code reading writing section 2.

The bar code reading writing section 2 can also record cassette management information upon a loading state or condition of the cassette 3. During recording of the program, or after the recording, the bar code reading writing section 2 records the cassette management information onto the label 5 which is stuck to the cassette 3, as the bar code 4, automatically or on the basis of remote-control input of the user or the like. In connection with the above, in case where the recorded contents are changed or modified, the labels are newly re-covered, and recording is performed.

Further, FIG. 12 is an explanatory view showing an example in which an IC memory is mounted on the cassette.

As shown in FIG. 12, an IC memory 7 is attached to a cassette 6. The IC memory 7 is connected to metal contacts 8 which are provided on a surface of the cassette 6. A deck body 9 has metal contact portions 10 which short-circuit to the metal contacts 8 on the surface of the cassette 6 upon tape loading. A CPU (not shown) performs transmission of data and a clock with respect to the IC memory 7 through the metal contact portions 10, to read out the cassette management information which is stored in the IC memory 7 and to write the desired cassette management information to the IC memory 7 to record the same.

FIG. 13 is an explanatory view for the description of the cassette management information.

As shown in FIG. 13, as the cassette management information, there are a cassette number, a tape length, a tape type, a title, a genre, a channel (TV channel), picture-recorded data, picture-recording start time code and the like. Of these, the picture-recorded date, the channel picture-recorded, the time code that is the picture-recoded recording position of the tape, picture-recording time and the like are automatically recorded by the VTR upon tape picture-recording. Meanwhile, regarding the title, the genre of the program and the like, recording is performed by, for example, remote-control input of a user or the like. In connection with the above, in case where, in a future, transmission codes such as a program name or the like are added to a television-broadcasting signal and are transmitted, automatic recording is possible to be performed also regarding the title.

In this manner, in the system shown in FIGS. 11 and 12, the cassette management information is not magnetically recorded on the tape, but the cassette information is recorded on a cassette management information recording medium such as bar code label, an IC memory or the like. For this reason, the user can display the cassette management information only by the fact that the cassette is loaded, or only by the fact that the cassette is mounted on the deck without reproduction of the tape. Accordingly, retrieval of the desired program is easy. Moreover, the point of the degree of freedom of the capacity, the data reliability and the data processing are also advantageous more than recording onto the tape, and the design is also easy. For these reasons, it is considered, in the future, as the cassette management system for public welfare, a method of recording the cassette management information onto the cassette management recording medium other than the tape comes into the main current as shown in FIGS. 11 and 12.

By the way, as case where the contents which are recorded onto an 8 mm or a VHS-C cassette which has been adopted in a camera-integrated-VTR are recorded onto a deferred VTR of a VHS system, or the like, dubbing is generally performed in which the contents which are recorded on the tape are recorded onto the other tape. In this dubbing, a device on the reproduction side and a device on the recording side are connected to each other by an image cable, an audio cable, an RF cable and the like, a reproducing signal of the tape on the reproduction side is given as a line input to the device on the recording, whereby recording is performed on the tape on the recording side.

Furthermore, a digital recording VTR has a digital interface (hereinafter, referred to as "digital I/F"), in addition to the connecting terminals of these image, audio and RF cables. The image and audio data, the sub-codes such as the time codes or the like which are reproduced from the tape on the reproducing side are supplied to the device on the recording side, through the digital I/F. The device on the recording side processes in signal the inputted digital data and, subsequently, error correction codes are added thereto so that they are recorded on the tape.

FIG. 14 is an explanatory view showing an example of an interface format of the data which are transmitted through such a digital interface.

In the digital interface format shown in FIG. 14, data of a single frame are divided into n and are packaged. A header is added to the top of each of the packing data. Then, sub-code information is arranged. The header includes data such as synchronous information or the like for performing inputting and outputting of the data between equipments. Subsequently, the image and audio information is arranged at predetermined arrangement in order of signal processing.

For example, in a DIVTR that is a broadcasting digital recording VTR, a 4:2:2 interface format that is a recommendation by CCIR is adopted, and the image and audio signals as well as a timing reference signal or the like are transmitted in synchronism with the image data. Further, in a CD, a DAT or the like, an EIAJ (Japan Electronic Machine Industry) digital audio interface standard is adopted to transmit the audio information, the sub-code information or the like. Upon dubbing, the reproducing signal from the device on the reproducing side is inputted to the device on the recording side, through the digital interface, and is encoded in accordance with the recording format of the device on the recording side and is recorded onto the tape.

However, in the aforesaid dubbing method, the information which is recorded onto the tape is only recorded onto the other tape, and the management information which is recorded onto the IC memory, the bar code label or the like which is the recording medium separate from the tape is not recorded in dubbing. For this reason, not only the cassette management information such as the title, the genre or the like which is recorded by the user, but also the cassette management information such as the TV channel which is automatically recorded by the VTR, the recorded date, the time code or the like is required to be newly re-recorded onto the dubbed cassette. This is extremely troublesome.

OBJECTS AND SUMMARY OF THE INVENTION

An object of the invention is to provide an information-signal recording apparatus, an information-signal reproducing apparatus and an information-signal recording and reproducing apparatus, which are capable of recording also cassette management information which is recorded onto a cassette management information recording medium, upon dubbing of tape information.

Moreover, an another object of the invention is to provide an information-signal recording apparatus, an information-signal reproducing apparatus and an information-signal recording and reproducing apparatus, which are capable of automatically recording cassette management information upon dubbing of tape information.

Furthermore, the other object of the invention is to provide an information-signal recording apparatus, an information-signal reproducing apparatus and an information-signal recording and reproducing apparatus, which are capable of judging, prior to dubbing, the fact that remaining recording capacity of a tape on the recording side is less than the reproducing time of a program to be dubbed, so that capacity insufficiency can be warned.

According to the invention, there is provided an information-signal recording and reproducing apparatus comprising a reproducing device for reading out and outputting dubbing information recorded onto a predetermined recording medium which is housed within a cassette on a reproducing side, and cassette management information recorded onto a predetermined cassette information recording medium which is provided on the cassette on the reproducing side, and a recording device for recording the inputted predetermined dubbing information onto a predetermined recording medium which is housed within the cassette on the recording side and for recording cassette management information associated with the dubbing information, onto a predetermined cassette information recording medium which is provided on the cassette on the recording side.

Further, according to the invention, there is provided an information-signal reproducing apparatus comprising reproducing means for reproducing a predetermined recording medium which is housed within a predetermined cassette to output dubbing information, cassette management information reading-out means for performing communication of cassette management information with respect to a predetermined cassette management information recording medium provided on the cassette, and first transmission means for multiplexing the cassette management information onto the dubbing information to output the same as a dubbing output.

Moreover, according to the invention, there is provided the information-signal recording apparatus comprising recording means for performing recording onto a predetermined recording medium which is housed within a predetermined cassette on the basis of dubbing information, cassette-management-information writing means for performing communication of cassette management information with respect to a predetermined cassette-management-information recording medium which is provided on the cassette, and separation means to which the dubbing information and the cassette management information are given, for separating the dubbing information from the dubbing input to give the same to the recording means and to give the cassette management information associated with the dubbing information, to the cassette-management-information writing means to record the cassette management information onto the cassette management information recording medium upon dubbing.

These and other objects and advantages of the present invention will become further apparent from the following detailed explanation.

BRIEF DESCRIPTION OF THE DRAWINGS

FIG. 3 is an explanatory view for the description of cassette management information;

FIG. 7 is an explanatory view for the description of the cassette management information;

FIG. 13 is an explanatory view for the description of the cassette management information.

DETAILED DESCRIPTION OF THE PREFERRED EMBODIMENTS

Figure 1:
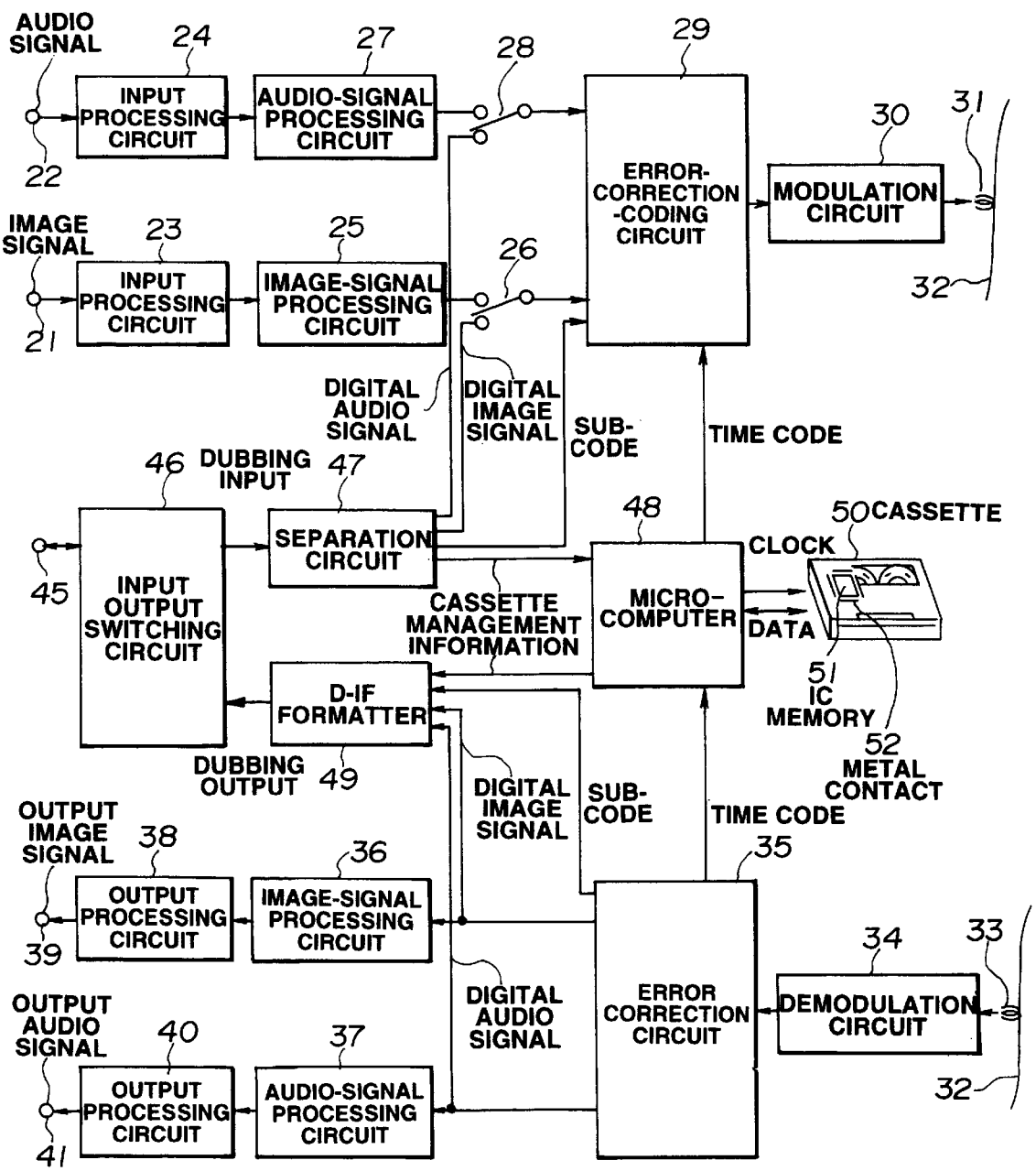
FIG. 1 is a block diagram showing an embodiment of an information-signal recording and reproducing apparatus according to the invention.

FIG. 1 is a block diagram showing an embodiment of an information-signal recording and reproducing apparatus according to the invention. The present embodiment is applied to a digital recording VTR.

An image signal and an audio signal are inputted respectively into input terminals 21 and 22. The image signal and the audio signal are given respectively to input processing circuits 23 and 24. The input processing circuit 23 inverts the image signal to a digital signal to give the same to an image-signal processing circuit 25. The image-signal processing circuit 25 applies digital signal processing such as shuffling, compressive processing or the like to the digital image signal to give the same to a terminal a of a switch 26. Meanwhile, the input processing circuit 24 converts the inputted audio signal to a digital signal, to give the same to an audio-signal processing circuit 27. The audio-signal processing circuit 27 applies digital signal processing to the digital audio signal and, thereafter, the audio-signal processing circuit 27 applies thereto time axis conversion to output the same to a terminal a of a switch 28.

The digital image signal and the digital audio signal from the switches 26 and 28 are given to an error-correction-coding circuit 29. The error-correction-coding circuit 29 adds an error correction code to the digital image signal and the digital audio signal and, thereafter, packages the same. In this case, a sub-code from a separation circuit 47 and a time code from a microcomputer 48 to be described subsequently are also given to the error-correction-coding circuit 29. These data are also packaged and are outputted to a modulation circuit 30.

Figure 2:
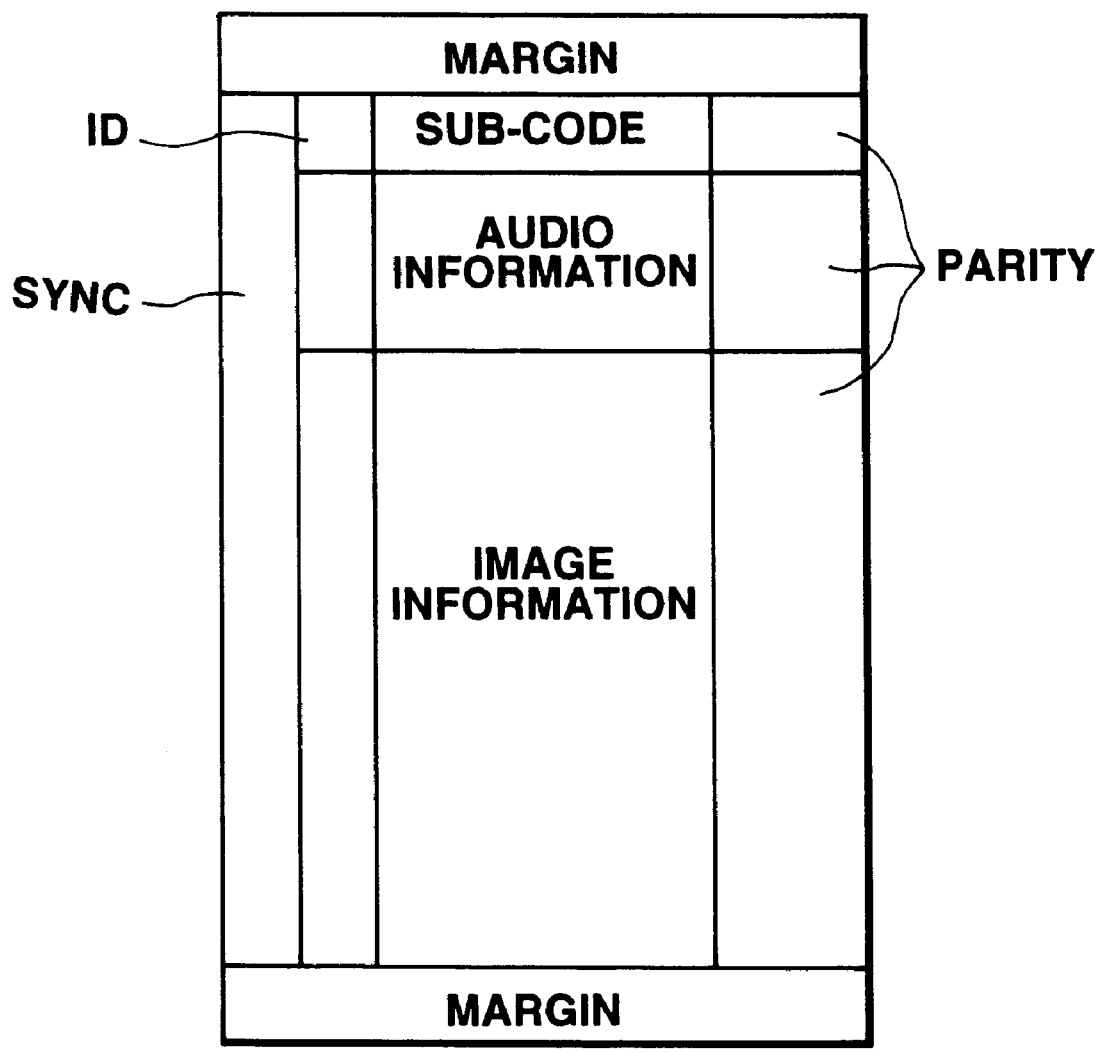
FIG. 2 is an explanatory view for the description of packing due to a modulation circuit 30 in FIG. 1.

FIG. 2 is an explanatory view for the description of the packing or package due to the error-correction-coding circuit 29 and the modulation circuit 30. One (1) packing data shown in FIG. 2 correspond to one (1) recording truck of the magnetic tape that is the recording medium.

As shown in FIG. 2, margins are provided respectively at the top and the rear of the 1 (one) packing data. The sub-code, the audio information and the image information are arranged subsequently to the top margin. The sub-code, the audio information and the image information are arranged in order of a synchronous signal (SYNC) unit. Each sink unit is arranged such that the sink is arranged at the top, ID is next arranged, various information including the sub-code, the audio information or the image information is next arranged and, finally, parity is added thereto.

An output from the error-correction-coding circuit 29 is given to the modulation circuit 30. The modulation circuit 30 applies modulation suitable for recording, to the inputted data, to give the same to a magnetic head 31, to thereby record the same onto a tape 32. Thus, the arrangement is such that the recording track is formed on the tape 32 by the code arrangement shown in FIG. 2.

Meanwhile, in a reproducing system, a magnetic head 33 reproduces the signal which is recorded onto a tape 32 to give the same to a modulation circuit 34. The modulation circuit 34 modulates the reproducing signal to output the same to an error correction circuit 35. The error correction circuit 35 uses an error correction code which is included in the reproducing signal, to preform error correction. The error correction circuit 35 separates the time code, the sub-code, the digital image signal and the digital audio signal from each other to output the same to the microcomputer 48, a D-IF formatter 49, an image-signal processing circuit 36 and an audio-signal processing circuit 37.

The image-signal processing circuit 36 applies predetermined digital processing to the digital image signal to give the same to an output processing circuit 38. The output processing circuit 38 is so arranged as to return the digital image signal to the analog signal to output the image signal to an output terminal 39. Further, the audio-signal processing circuit 37 applies predetermined digital processing to the digital audio signal to give the same to an output processing circuit 40. The output processing circuit 40 returns the digital audio signal to the analog signal to output the same through an output terminal 41.

In the present embodiment, the deck body (not shown) has a metal contact (not shown) which is connected to a metal contact 52 on a cassette 50 by mounting of the cassette 50, and the metal contact is connected to the microcomputer 48. An IC memory 51 is adhered to or mounted on the cassette 50. A data bus and a clock terminal (not shown) of the IC memory 51 are connected to the metal contact 52. Thus, transmission of the data and the clock is made possible between the microcomputer 48 and the IC memory 51 through the metal contact 52 on the cassette 50 and the metal contact of the deck body. The IC memory 51 can record thereon the cassette management information regarding the program which is recorded on the cassette tape of the cassette 50.

FIG. 3 is an explanatory view for the description of the cassette management information which is to be recorded on the IC memory 51 in FIG. 1.

As shown in FIG. 3, the cassette number, the tape length, the tape type, the title, the genre, the TV channel, the recorded date, the recording start time code and the like are so arranged as to be recorded onto the IC memory 51 as the cassette management information. In FIG. 3, it is indicated that the cassette number of the cassette 50 is three (3), and the tape length is four (4) hours. Moreover, it is indicated that the program in which the genre in which the title is TITLE 3 is 1 (sports) is the program of an 8th (eighth) channel in which recording starts from a position of time code: 2: 00: 05, on Jun. 17, 1993.

In the present embodiment, the arrangement is such that the microcomputer 48 reads out the cassette management information from the IC memory 51, and the cassette management information is given to the D-IF formatter 49. The sub-code, the digital image signal and the digital audio signal are also given to the D-IF formatter 49 from the error correction circuit 35. The D-IF formatter 49 arranges these data on the basis of the predetermined digital interface format.

Figure 4:
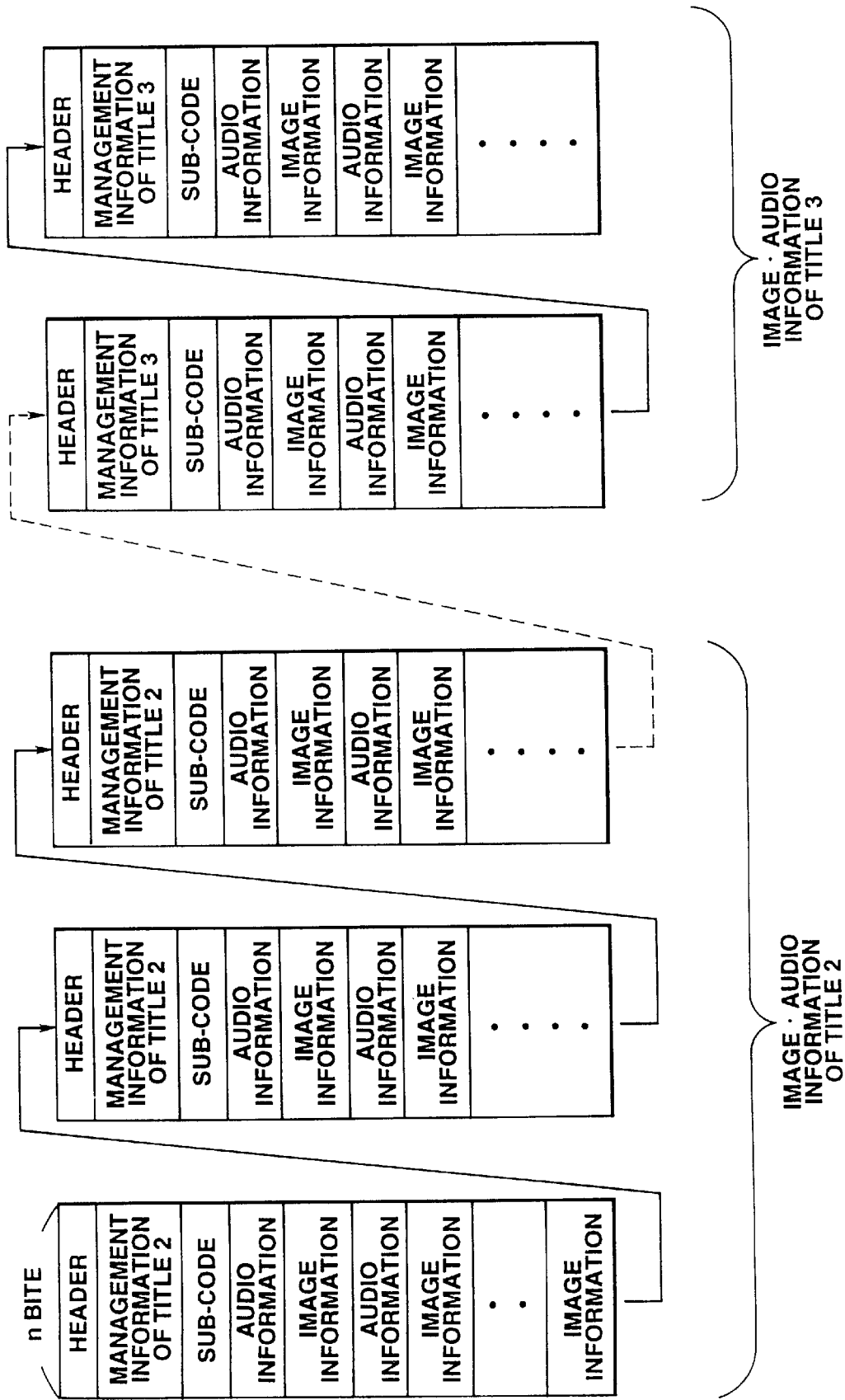
FIG. 4 is an explanatory view for the description of a format due to a D—If formatter in FIG. 1.

FIG. 4 is an explanatory view for the description of the format due to the D-IF formatter in FIG. 1.

The D-IF formatter 49 packages the cassette management information, the sub-code, the image information and the audio information. A header is added to the top of each of the packing data. Subsequently, arrangement is made in order of the management information of the predetermined title, the sub-code, the audio information, the image information, the audio information, the image information . . . . The header is formed by n bites, the management information is formed by n×k1 bites, and the sub-code is formed by n×k2 bites. The arrangement is such that the information of a plurality of titles is packaged by predetermined data lengths. The information of each of the titles is formed by a plurality of packing data. FIG. 4 shows an example in which the title is such that the information of TITLE 2 and the information of TITLE 3 are packaged.

Figure 5:
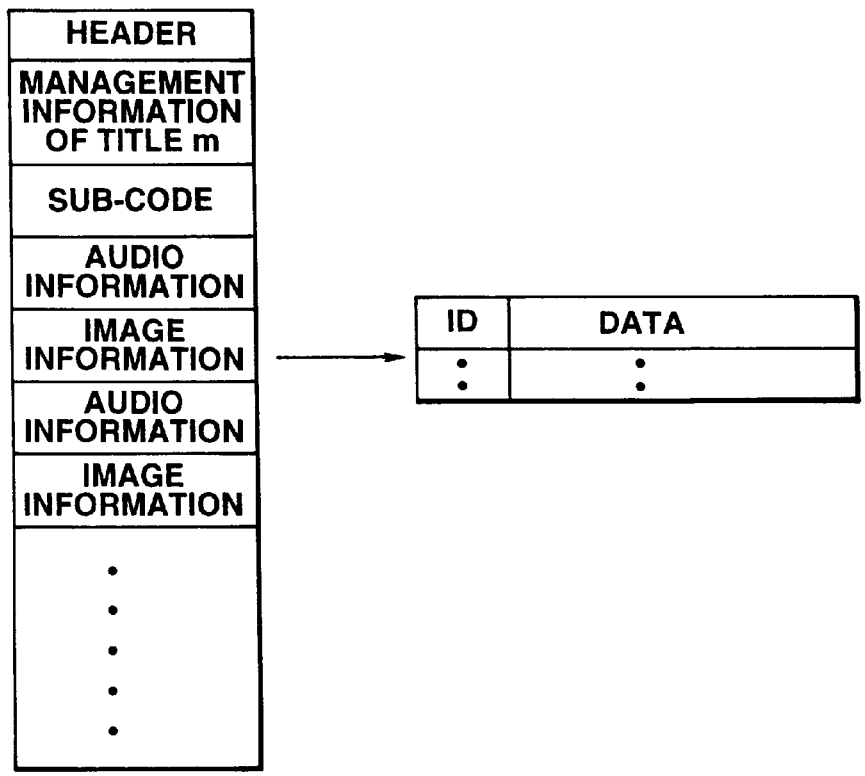
FIG. 5 is an explanatory view for the description of the format due to the D—If formatter in FIG. 1.
Figure 6:
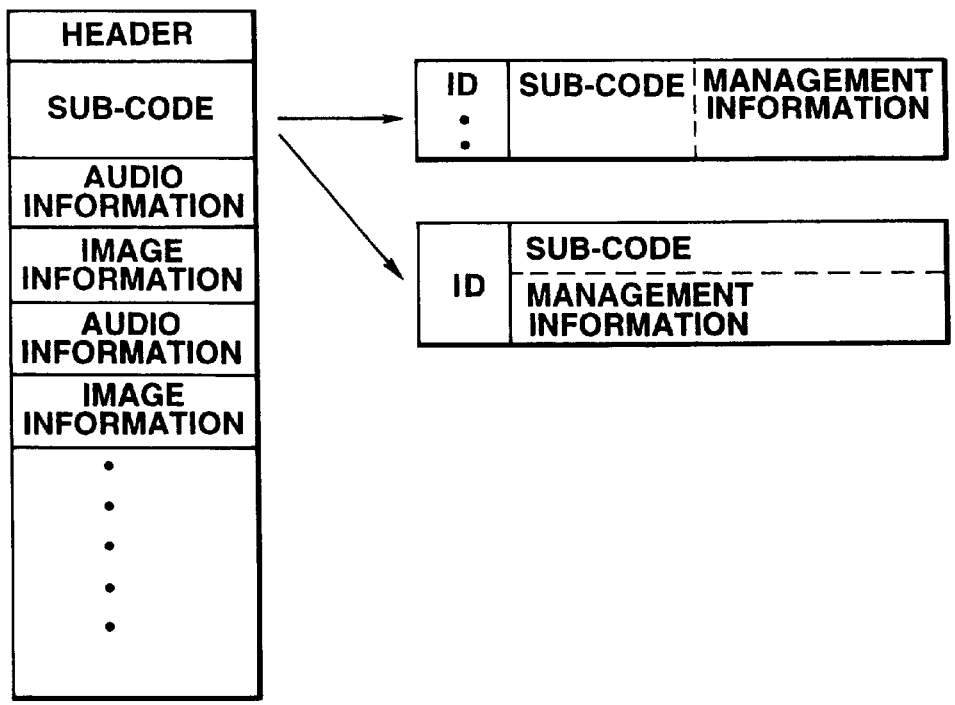
FIG. 6 is an explanatory view for the description of the format due to the D—If formatter in FIG. 1.

In connection with the above, as shown in FIG. 5, each of the management information is formed by a plurality of (ID+management information) units with the n bites which have the ID and the data serving as a single unit. Further, in consideration also of the fact that the amount or quantity of information of the sub-code is relatively low or small, the cassette management information may be arranged in a sub-code area or region, as shown in FIG. 6. A right-upper portion in FIG. 6 shows an example in which the ID, the sub-codes and the management information are formed by n bites, while a right-lower portion in FIG. 6 shows an example in which the ID and the sub-code are formed by n bites, and the ID and the management information are similarly formed by n bites.

The information which is formatted by the D-IF formatter 49 correspondingly to such digital interface is given to the input output switching circuit 49 as a dubbing output. The input output switching circuit 49 outputs an output from the D-IF formatter 49 to a digital interface (I/F) 45 upon dubbing output.

A dubbing input from the other deck is also inputted to the digital I/F 45. The dubbing input which is inputted through digital I/F 45 includes the audio information, the image information, the sub-code and the cassette management information. An input output switching circuit 46 gives these digital signals to the separation circuit 47 upon dubbing input. The separation circuit 47 separates the digital image signal, the digital audio signal and the sub-code from each other to output the same to terminals b of the respective switches 26 and 28 and the error-correction-coding circuit 29. The separation circuit 47 separates the cassette management information from each other to output the same to the microcomputer 48. Upon dubbing, the digital image signal and the digital audio signal from the other deck are inputted through the digital I/F formatter 46. The switches 26 and 28 select the terminal b, whereby these digital signals are recorded.

The cassette management information in accordance with the contents which are dubbed is given to the microcomputer 48. The information of the title, the genre, the TV channel and the picture-recorded date is given to the IC memory 51 and is stored therein as it is. In this connection, the arrangement is such that the microcomputer 48 generates an information of the time code in accordance with the picture-recording start position of the cassette 50 on the recording side, regarding an information of the time code, to give the same to the IC memory 51.

Operation of the embodiment arranged in this manner will next be described with reference to the explanatory view of FIG. 7. FIG. 7 is an explanatory view showing the cassette management information which is stored in the IC memory 51 on the recording side at the time when the image and audio information of TITLE 2 and 3 in FIG. 3 are dubbed to perform recording from the top position of the tape on the recording side. The present embodiment is an example in which the cassette management information is also transmitted together with the digital image signal and the digital audio signal, through the digital interface 45.

A reproducing system will first be described.

Upon reproducing, the magnetic head 33 reproduces the signal which is recorded onto the tape 32 to give the same to the modulation circuit 34. The modulation circuit 34 modulates the reproducing signal. The error correction circuit 35 corrects the error of the reproducing signal by the use of the error correction code and separates the packaged information into the sub-code, the digital image signal and the digital audio signal.

The analog signal is produced from the output terminals 39 and 41. Specifically, the digital image signal and the digital audio signal from the error correction circuit 35 are given respectively to the image-signal processing circuit 36 and the audio-signal processing circuit 37 so as to be digitally processed. The digital image signal and the digital audio signal are returned to the analog signal by the output processing circuits 38 and 40 and are outputted from the output terminals 39 and 41. The image signal and the audio signal from the output terminals 39 and 41 are given to a monitor device (not shown), to thereby project a reproduced image.

Meanwhile, it is assumed that the information shown in, for example, FIG. 3 is stored, as the cassette management information of the cassette 50, in the IC memory 51 which is adhered to the cassette 50 on the reproducing side. It is considered that TITLE 1 to TITLE 4, . . . of the title and the genre of the cassette management information are automatically recorded in Japan in the future on the basis of the broadcasting codes. At present, however, TITLE 1 to TITLE 4, . . . of the title and the genre of the cassette management information are recorded by inputting operation of the user. The other information of the cassette management information is automatically recorded simultaneously with the image signal and the audio signal, on the basis of the signal from a tuner (not shown) of the VTR and the microcomputer 48.

The microcomputer 48 reads the cassette management information from the IC memory 51 through the metal contact 52. The microcomputer 48 extracts the data of the management information regarding the program which is reproduced, at present, from the read cassette management information to output the same to the D-IF formatter 49.

Now, it is assumed that the title which is recorded onto the tape 32 of the cassette 50 reproduces the program of TITLE 2, and outputs the reproduced output (dubbing information) as a dubbing output so that the outputted reproduced output is dubbed by the other recording and reproducing apparatus. In this case, the microcomputer 48 extracts the management information of TITLE 2 of the cassette management information in FIG. 3, to output the same to the D-IF formatter 49. In this connection, as shown in FIG. 5, the cassette management information and the sub-code may be arranged at the other region, and as shown in FIG. 6, the management information may be arranged at the sub-code region.

It is next assumed that, following to or in continuation to the dubbing output of the program in which the title is TITLE 2, the program in which the title is TITLE 3 is outputted in dubbing. In this case, the microcomputer 48 extracts the cassette management information of TITLE 3 to give the same to the D-IF formatter 49. As shown in FIG. 4, the D-IF formatter 49 packages the cassette management information of TITLE 3, together with the sub-code, the image information and the audio information of the program of TITLE 3, to output the same. The packing data from the D-IF formatter 49 are given to the digital I/F 45 through the input output switching circuit 46 and are outputted to the other recording and reproducing apparatus (not shown).

Operation of a recording system will next be described.

An analog input is inputted through the terminals 21 and 22. The inputted image signal and audio signal are given to the input processing circuit 23 and the input processing circuit 24 respectively through the input terminals 21 and 22 so as to be converted to a digital signal. The image-signal processing circuit 25 and the audio-signal processing circuit 27 process, in signal, respectively the digital image signal and the digital audio signal to give the same to the terminals a of the switches 26 and 28. When the switches 26 and 28 select the terminals a, the error-correction-coding circuit 29 adds the error correction code to the digital image signal and the digital audio signal from the image-signal processing circuit 25 and the audio-signal processing circuit 27, and packages the same to give the same to the modulation circuit 30. The modulation circuit 30 modulates the packing data to give the same to the magnetic head 31, to thereby magnetically record the same onto the tape 32.

Meanwhile, it is assumed that the dubbing input which is transmitted by the format in FIG. 4 is inputted to the digital I/F 45. Upon dubbing input, the input and output switching circuit 46 selects the dubbing input to output the same to the separation circuit 47. The separation circuit 47 separates the digital image signal, the digital audio signal, the sub-code and the management information from the dubbing input, to output the same to the terminals b of the respective switches 26 and 28, the error-correction-code addition circuit 29 and the microcomputer 48.

The switches 26 and 28 select the terminals b upon dubbing, to supply the digital image signal and the digital audio signal from the separation circuit 47 to the error-correction-coding circuit 29. The error-correction-coding circuit 29 packages the inputted data by the format in FIG. 2 to give the same to the modulation circuit 30. The modulation circuit 30 modulates the packing data to give the same to the magnetic head 31, to thereby record the same onto the tape 32. In this manner, the image, the audio and the sub-code of TITLE 2 in FIG. 4 are recorded onto the tape 32. In this connection, the error-correction-code addition circuit 29 does not use the time code included in the dubbing input, regarding the time code of the sub-code, but uses the time code from the microcomputer 48.

Meanwhile, the cassette management information of TITLE 2 is inputted to the microcomputer 48. Of the cassette management information, the information including the title, the genre, the TV channel and the picture-recorded date are transmitted to the IC memory 51 of the cassette 50 as they are and are stored therein. For example, if it is assumed that the cassette management information of TITLE 2 is those illustrated in FIG. 3, the cassette management information which indicates that, as shown in FIG. 7, the title is TITLE 2, the genre is 3 (picture), the TV channel is 10th channel, and the picture-recorded date is Jun. 14, 1993 is recorded in the IC memory 51.

The picture-recording start position in the tape on the reproducing side of TITLE 2 and the picture-recording start position of the tape on the recording side of TITLE 2 are different from each other. However, the microcomputer 48 generates the time code of the recording tape 32 to give the same to the error-correction-coding circuit 29. The time code is used to store the picture-recording start time code in the IC memory 51. In this connection, as shown in FIG. 7, the information which indicates that the number of the cassette 50 on the recording side is five (5), and the tape length is two (2) hours is recorded on the IC memory 51.

It is assumed that, when the dubbing of TITLE 2 is ended or completed, dubbing of TITLE 3 is continuously or continually performed. In this case, also the information of the image, the audio and the sub-code of TITLE 3 is packaged by the error-correction-code addition circuit 29, and is recorded onto the tape 32, and the cassette management information of TITLE 3 is created by the microcomputer 48. Similarly to case of TITLE 2, regarding also TITLE 3, only the information regarding the tape position is written, and the other information is stored in the IC memory 51 as it is. In case where the picture-recording start time code of TITLEs 2 and 3 is that as shown in FIG. 3, if dubbing is performed from the head of the tape 32 of the cassette 50 on the picture-recording side, the picture-recording start time code which is recorded on the IC memory 51 comes into that shown in FIG. 7, for example. In connection with this, the picture-recording start time code of TITLE 6 which is recorded previously is written to the picture-recording ending or completion position of TITLE 3.

In this manner, the present embodiment is arranged such that the microcomputer 48 reads out the cassette management information which is stored in the IC memory 51, and the D-IF formatter 49 packages the cassette management information together with the digital image signal, the digital audio signal and the sub-code, to output the same through the digital inter face. Thus, it is possible to include the cassette management information in the dubbing output. Further, upon recording of the dubbing input, the separation circuit 47 separates the cassette management information. The microcomputer 48 creates the cassette management information of the recording cassette on the basis of the cassette information which is included in the dubbing input, to store the same into the IC memory 51. Thus, it is possible to automatically record the cassette information of the program to be dubbed onto the cassette management recording medium on the recording side.

In connection with the above, in the present embodiment, the example in which only the cassette management information of the program which performs dubbing output is extracted to transmit the same together with the image and audio information has been described. However, the arrangement may be such that all the cassette management information which is read by the microcomputer is transmitted to the recording side, and the cassette management information required on the recording side is selected and is recorded. Moreover, the arrangement may be such that the cassette management information is transmitted prior to the image information and the audio information, the time code is extracted, on the recording side, from the sub-code which is transmitted together with the image information and the audio information, and the cassette management information of the program to be dubbed is judged from the time code, to select the corresponding cassette management information by the microcomputer. Furthermore, in FIG. 4, the management information of TITLE m is arranged. However, the arrangement may be such that all the management information is arranged on this portion and is transmitted, and only the cassette management information which is required on the recording side is extracted and is recorded.

In connection with the above, the information-signal reproducing apparatus according to the embodiment of the invention can be formed by the reproducing system in FIG. 1, the microcomputer 48 and the D-IF formatter 49, and the information-signal recording apparatus according to the embodiment of the invention can be formed by the recording system, and the microcomputer 48 and the separation circuit 47.

Figure 8:
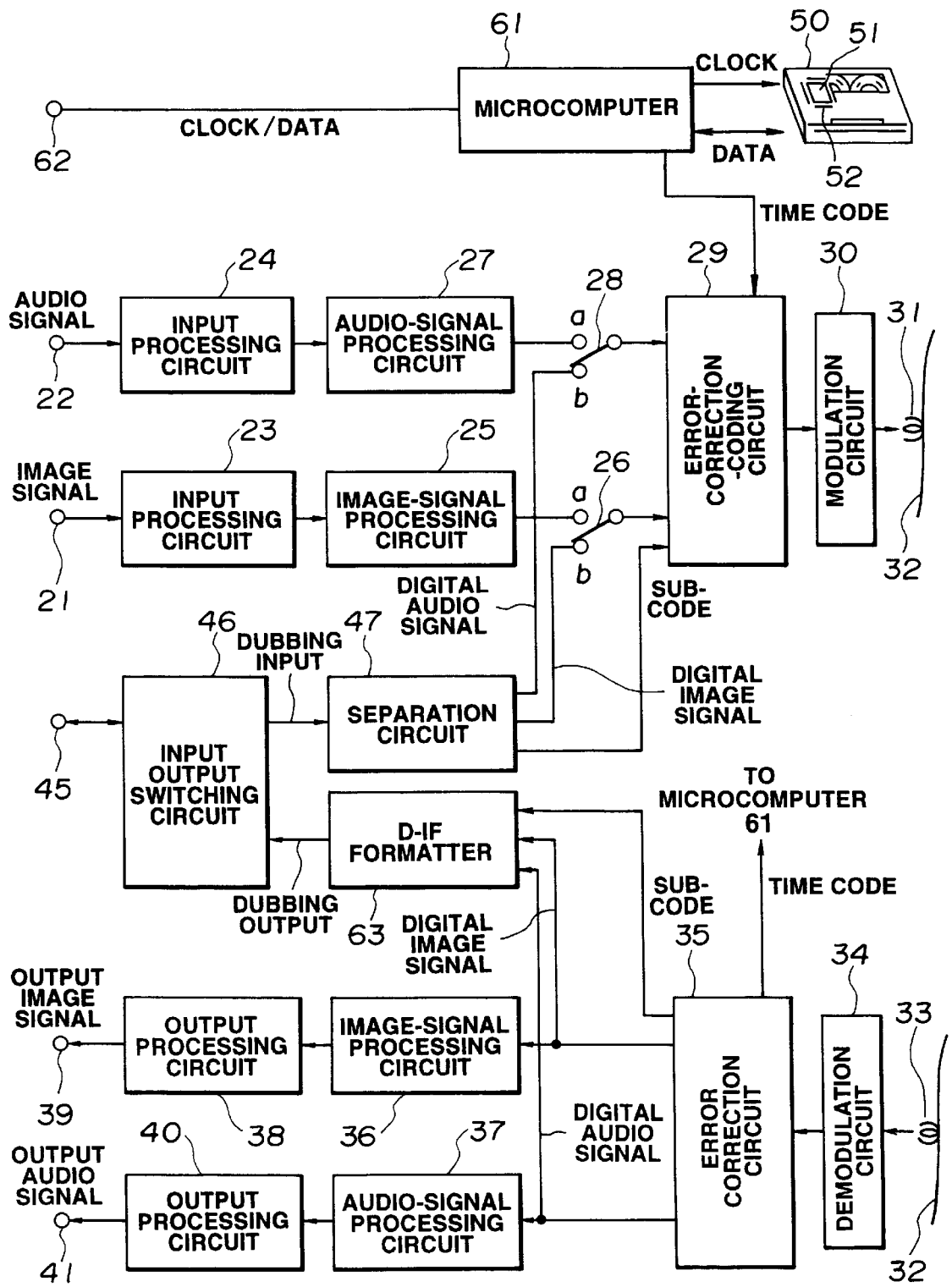
FIG. 8 is a block diagram showing an another embodiment of the invention.

FIG. 8 is a block diagram showing an another embodiment of the invention. In FIG. 8, the same reference numerals are applied to constitutional elements the same as those illustrated in FIG. 1, and the description thereof will be omitted. The present embodiment is an example in which the cassette management information is transmitted along a path different from that of the image and audio dubbing information.

In FIG. 1, the cassette management information has been transmitted by the transmitting system the same as the digital image and audio signals. However, in the present embodiment, in consideration of case where the digital I/F is not had like the analog VTR, case where the cassette management information cannot be included in the digital interface format, or the like, the transmitting system exclusive or dedicated for the cassette management information is provided.

A VTR body (not shown) is provided with an external input output terminal 62 for transmitting cassette management information. The external input output terminal 62 enables data and clock to be transmitted with respect to a microcomputer 61. The arrangement is such that the microcomputer 61 is capable of transmitting the data and the clock with respect to an IC memory 51 which is attached on a cassette 50, and the microcomputer 61 reads out cassette management information which is stored in the IC memory 51, and the created cassette management information is given to the IC memory 51 and is stored therein. In this connection, a D-IF formatter 63 packages the digital image signal, the digital audio signal and the sub-code from an error correction circuit 35 by the digital interface format, to output the same as the dubbing output.

In the embodiment arranged in this manner, the cassette management information which is read out by the microcomputer 61 can be outputted to the other recording apparatus through the external input output terminal 62, and the cassette management information from the other reproducing apparatus can be supplied to the microcomputer 61 through the external input output terminal 62. In this connection, the arrangement may be such that the microcomputer 61 transmits only the cassette management information of the program which performs dubbing input and output, simultaneously with the dubbing input and output. The arrangement may also be such that the microcomputer 61 transmits all the cassette management information on the reproducing side, judges, on the recording side, the corresponding cassette management information on the basis of the time code included in the sub-code, and creates and records the cassette management information of the recording cassette, on the basis of the selected cassette management information.

Figure 9:
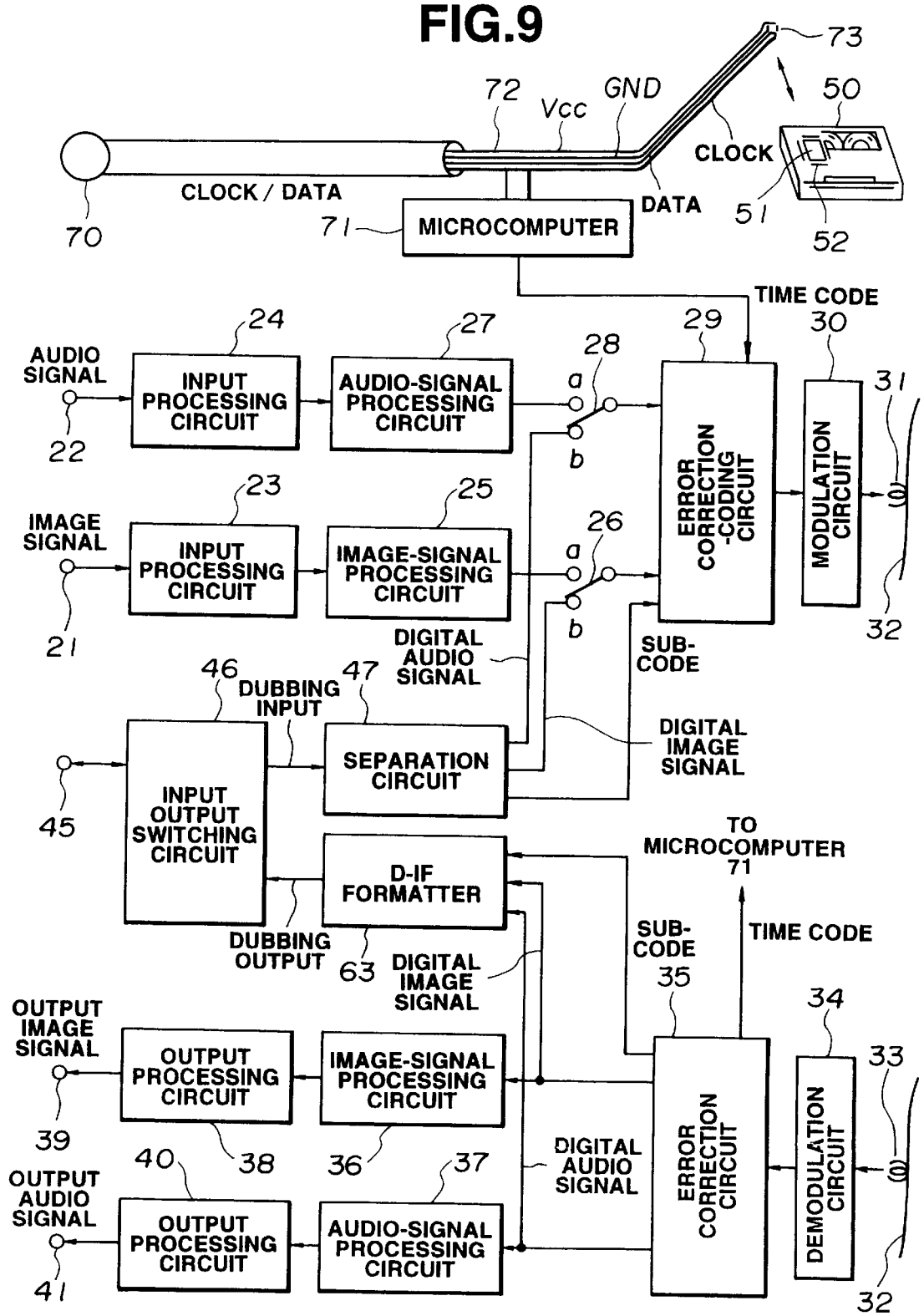
FIG. 9 is a block diagram showing an another embodiment of the invention.
Figure 10:
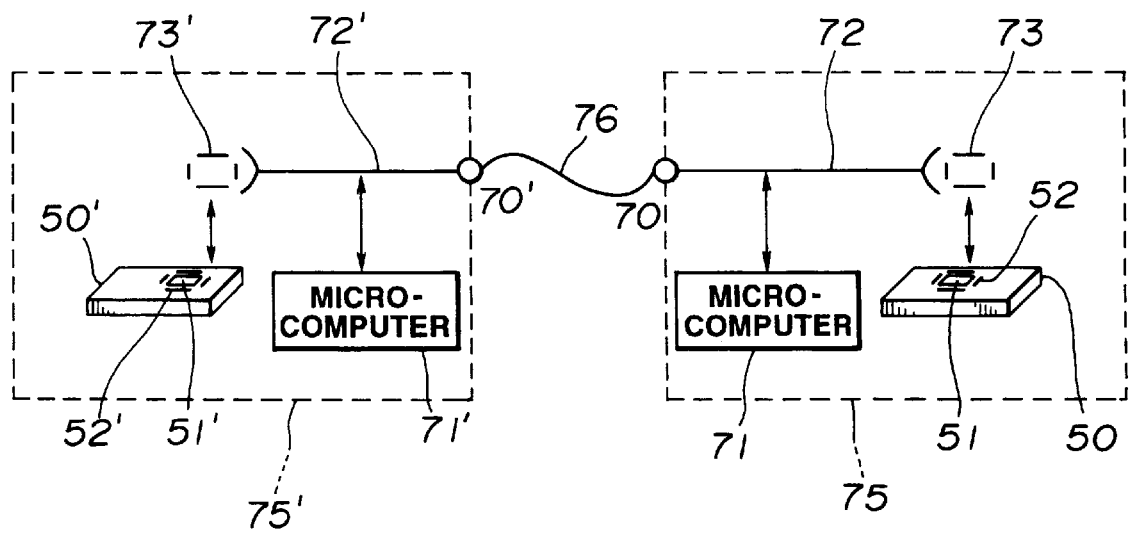
FIG. 10 is an explanatory view for the description of the embodiment illustrated in FIG. 9.
Figure 11:
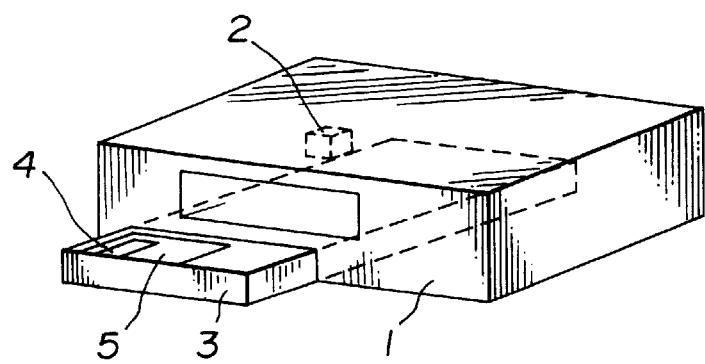
FIG. 11 is an explanatory view for the description of a bar code label which records cassette management information.
Figure 12:
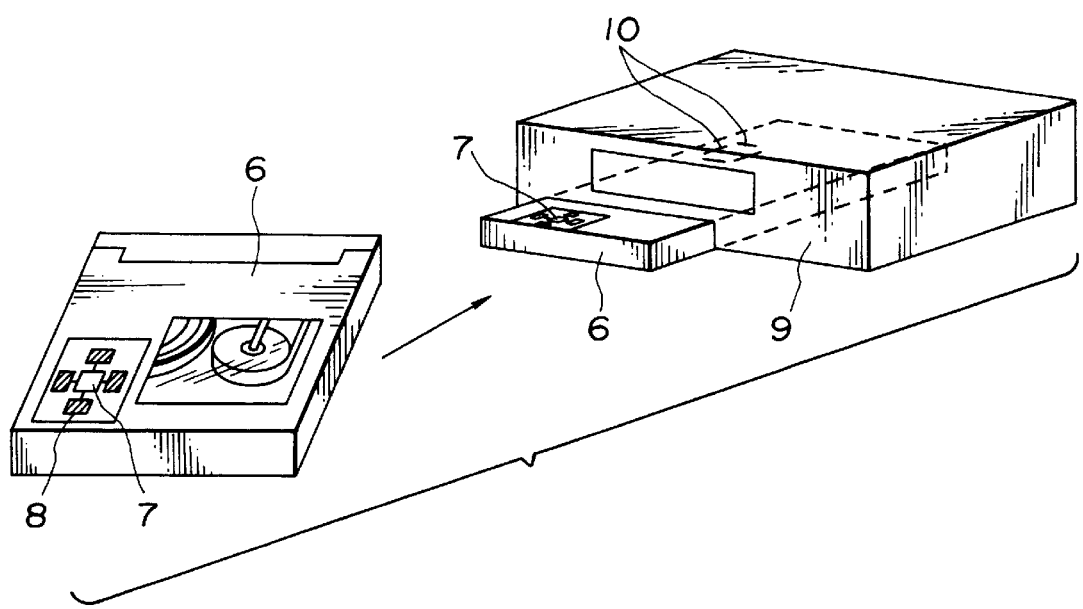
FIG. 12 is an explanatory view for the description of an IC memory which records the cassette management information.
Figure 14:
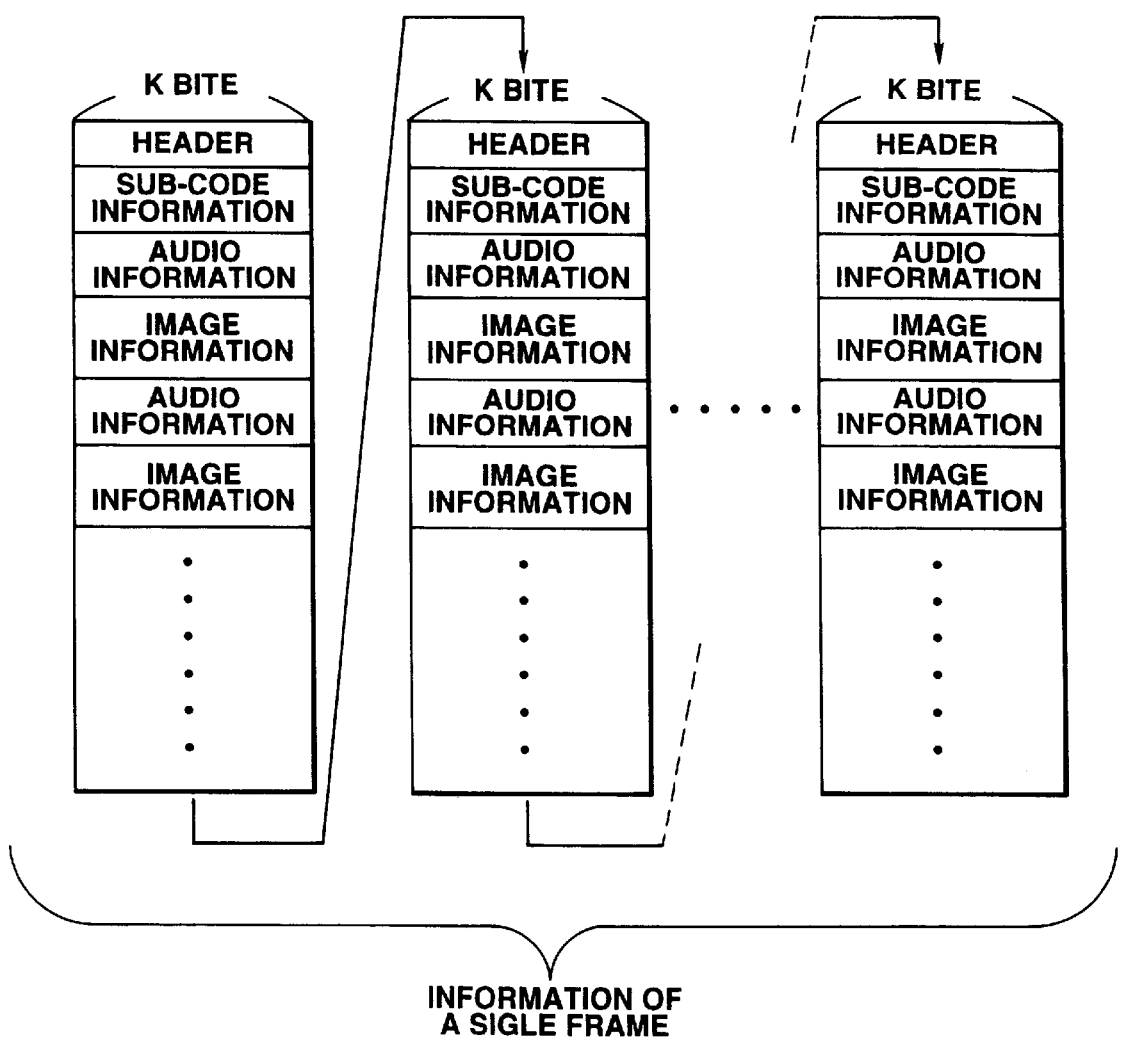
FIG. 14 is an explanatory view for the description of a digital interface format in the prior art.

FIG. 9 is a block diagram showing an another embodiment of the invention. Further, FIG. 10 is an explanatory view for describing transmission of the cassette management information according to the embodiment in FIG. 9. In FIG. 9, the same reference numerals are applied to the constitutional elements the same as those in FIG. 8, and the description thereof will be omitted. The present embodiment is an example in which the cassette management information is transmitted by a transmitting path different from that of the dubbing data of the image information and the audio information, similarly to the embodiment in FIG. 8.

In FIGS. 9 and 10, a casing of a VTR 75 is provided with an external input output terminal 70 for transmitting the cassette management information. The external input output terminal 70 is connected to a microcomputer 71 and a contact 73 through a bus 72. The bus 72 is formed by, for example, IICBUS, and has a power-source line Vcc, a ground line GND, a data line and a clock line. The contact 73 is capable of being connected to a metal contact 52 which is connected to the IC memory 51. The microcomputer 71 is arranged such that any of the contact 73 and the external input output terminal 70 are capable of transmitting the data through the bus 72.

In the embodiment arranged in this manner, as shown in FIG. 10, a pair of VTRs 75 and 75' which are the same in arrangement as those in FIG. 9 are connected between a pair of external input output terminals 70 and 70' by a cable 76. Thus, the contact 73 is connected to the microcomputer 71 by the bus 72, and is also connected to a microcomputer 71' of the VTR 75' through the external input output terminal 70, the cable 76, the external input output terminal 70' and a bus 72'. The microcomputer 71' is the same in arrangement as the microcomputer 70. The microcomputer 71' can read out cassette management information from the IC memory 51 of a cassette 50 which is mounted on the VTR body 75, through the metal contact 52 connected to the contact 73, similarly to the microcomputer 71. Similarly, the microcomputer 71 can also directly read out the cassette management information of an IC memory 51' of a cassette 50' which is mounted on the VTR 75'.

Now, it is assumed that the dubbing output from the side of the VTR 75' is recorded on the side of the VTR 75. The microcomputer 71 is capable of communicating with the bus 72 in case where the bus 72 is not BUS BUSY, that is, in case where the microcomputer 71' does not perform communication. When the dubbing signal of the image and the audio from the VTR 75' is recorded in dubbing in the VTR 75, the microcomputer 71 performs communication with respect to the bus 72, and directly reads the cassette management information from the IC memory 51' of the cassette 50' on the reproducing side. The microcomputer 71 judges the corresponding cassette management information from the time code which is included in the program under dubbing at present and extracts the same. The microcomputer 71 creates the cassette management information for the recording cassette 50, on the basis of the extracted cassette management information, and writes the same to the IC memory 51 through the bus 72.

The embodiment illustrated in FIGS. 9 and 10 may arranged such that only the cassette management information regarding the program under being transmitted is transmitted, similarly to the embodiment in FIG. 1. Further, the arrangement may also be such that all the cassette management information is transmitted, and only the corresponding cassette management information is extracted on the recording side, and is recorded. Moreover, it is also similar to those in the embodiment in FIG. 1 to rewrite the recording start time code to information on the recording side without the use of the transmitted cassette management information, and to record the time code in the sub-code by the use of the information on the recording side.

In these embodiments, the cassette management information on the reproducing side is automatically recorded onto the cassette management information recording medium which is provided on the cassette on the recording side upon transmission of the image and audio signals. Accordingly, the microcomputer of the apparatus on the recording side can grasp the information time (reproducing time) of the program which is inputted in dubbing from the cassette management information. Moreover, the microcomputer of the apparatus on the recording side can calculate or compute the remaining recording capacity of the recording tape from the present time code and the cassette tape length included in the cassette management information of the recording cassette. Accordingly, the microcomputer of the apparatus on the recording side can judge, before recording, the fact that the remaining recording capacity of the tape on the recording side is less or shorter than the reproducing time of the program to be dubbed, and can also warn the capacity insufficiency or shortage by display onto the deck body, by image-plane display due to on-screen characters, or the like, for example. In this manner, it is also possible to previously notify the user of the fact that recording ends on the way of recording. Thus, it is possible to prevent deficiencies such as redoing of dubbing and the like.

In this invention, it is apparent that working modes different in a wide range can be formed on the basis of this invention without departing from the spirit and scope of the invention. This invention is not restricted by any specific embodiment except being limited by the appended claims.

What is claimed is:

1. An information-signal reproducing apparatus, comprising:
   control means for selecting a portion of a signal recorded on a medium housed in a cassette;
   signal reproducing means for reproducing the selected portion of the signal and outputting the selected portion of the signal as a dubbing information;
   cassette management information reading-out means for communicating cassette management information with respect to a cassette management information recording medium which is provided on said cassette; and
   transmission means for outputting a dubbing output, the dubbing output comprising a portion of the cassette management information multiplexed with the dubbing information,
   wherein the portion of the cassette management information corresponds to the dubbing information.

2. An information-signal reproducing apparatus according to claim 1, wherein said transmission means has a digital input output portion and outputs said dubbing information and said cassette management information in a predetermined dubbing data format.

3. An information-signal reproducing apparatus according to claim 1, wherein said cassette management information recording medium is an integrated-circuit memory.

4. An information-signal reproducing apparatus according to claim 1, wherein said cassette management information reading-out means sets or loads said cassette to read out said cassette management information.

5. An information-signal reproducing apparatus according to claim 1, wherein said cassette management information reading-out means reads out substantially all of the cassette management information which is recorded onto said cassette management information recording medium.

6. An information-signal reproducing apparatus according to claim 5, wherein said cassette management information reading-out means reads out at least the portion of said cassette management information.

7. An information-signal reproducing apparatus, comprising:
   control means for selecting a portion of a signal recorded on a medium housed in a cassette;
   signal reproducing means for reproducing the selected portion of the signal and outputting the selected portion of the signal as a dubbing information;
   cassette management information reproducing means for reproducing cassette management information recorded on a cassette management information recording medium, said cassette management information recording medium being provided on said cassette; and
   transmission means for outputting a dubbing output, the dubbing output comprising a portion of the cassette management information multiplexed with the dubbing information,
   wherein the portion of the cassette management information corresponds to the dubbing information.

8. An information-signal reproducing apparatus according to claim 7, wherein said transmission means has a digital input/output portion and outputs said dubbing output in a predetermined dubbing data format.

9. An information-signal reproducing apparatus according to claim 7, wherein said cassette management information reproducing means reads out substantially all of the cassette management information which is recorded onto said cassette management information recording medium.

10. An information-signal reproducing apparatus according to claim 7, wherein said cassette management information reproducing means reads out at least the portion of said cassette management information.

11. An information-signal reproducing apparatus, comprising:
    signal reproducing means for reproducing a signal recorded on a medium housed in a cassette and outputting dubbing information;
    cassette management information reading-out means for communicating cassette management information with respect to a cassette management information recording medium which is provided on said cassette; and
    transmission means for multiplexing said cassette management information with said dubbing information to output a dubbing output.

12. An information-signal reproducing apparatus according to claim 11, wherein said transmission means has a digital input output portion and outputs said dubbing information and said cassette management information in a predetermined dubbing data format.

13. An information-signal reproducing apparatus according to claim 11, wherein said cassette management information recording medium is an integrated-circuit memory.

14. An information-signal reproducing apparatus according to claim 11, wherein said cassette management information reading-out means sets or loads said cassette to read out said cassette management information.

15. An information-signal reproducing apparatus according to claim 11, wherein said cassette management information reading-out means reads out substantially all of the cassette management information which is recorded onto said cassette management information recording medium.

16. An information-signal reproducing apparatus according to claim 11, wherein said cassette management information reading-out means reads out at least a portion of said cassette management information, the portion of said cassette management information being associated with the dubbing information which is outputted by said reproducing means.

17. An information-signal reproducing apparatus, comprising:
    signal reproducing means for reproducing a signal recorded on a medium housed in a cassette and outputting dubbing information;
    cassette management information reproducing means for reproducing cassette management information recorded on a cassette management information recording medium, said cassette management information recording medium being provided on said cassette; and
    transmission means for outputting a dubbing output, said dubbing output being said cassette management information multiplexed with said dubbing information.

18. An information-signal reproducing apparatus according to claim 17, wherein said transmission means has a digital input/output portion and outputs said dubbing output in a predetermined dubbing data format.

19. An information-signal reproducing apparatus according to claim 17, wherein said cassette management information reading-out means reads out substantially all of the cassette management information which is recorded onto said cassette management information recording medium.

20. An information-signal reproducing apparatus according to claim 17, wherein said cassette management information reading-out means reads out at least a portion of said cassette management information, the portion of said cassette management information being associated with the dubbing information which is outputted by said reproducing means.

* * * * *